United States Patent
Hunter et al.

(10) Patent No.: US 8,218,202 B2
(45) Date of Patent: Jul. 10, 2012

(54) MULTIPLE IMAGE COMBINATION VIA COMPARATIVE DATA TRANSFORM AND NORMALIZATION TRANSFORM APPLICATION

(75) Inventors: Andrew Hunter, Bristol (GB); Stephen Pollard, Dursley (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1099 days.

(21) Appl. No.: 11/930,981

(22) Filed: Oct. 31, 2007

(65) Prior Publication Data

US 2008/0100878 A1    May 1, 2008

(30) Foreign Application Priority Data

Oct. 31, 2006 (GB) .................................. 0621639.4

(51) Int. Cl.
*H04N 1/387* (2006.01)
*G06K 7/00* (2006.01)

(52) U.S. Cl. ........ 358/450; 358/462; 358/465; 358/470; 358/474; 358/475; 358/479; 358/480; 358/488; 358/496; 358/401; 358/405; 358/408; 358/409; 358/505; 358/1.9; 382/318; 382/277; 382/287; 382/291; 382/294; 382/312; 382/314; 382/315; 382/317; 382/321; 399/32; 399/151; 399/200; 399/202; 399/211; 347/37; 347/129; 347/225; 347/233; 347/250

(58) Field of Classification Search ............. 358/450, 358/462, 465, 466, 470, 474, 475, 479, 480, 358/401, 405, 408, 409, 410, 488, 497; 382/318, 382/272, 277, 287, 291, 294, 314, 315, 317, 382/319, 321

See application file for complete search history.

(56) References Cited

U.S. PATENT DOCUMENTS

| 5,414,529 | A | | 5/1995 | Terada et al. |
| 5,647,026 | A | * | 7/1997 | Kwarta ......................... 382/270 |
| 6,144,778 | A | * | 11/2000 | Beauchamp et al. ......... 382/318 |
| 6,346,989 | B1 | * | 2/2002 | Funada et al. ............... 358/1.14 |
| 6,570,612 | B1 | | 5/2003 | Saund et al. |
| 6,603,874 | B1 | * | 8/2003 | Stern et al. ................... 382/144 |

(Continued)

FOREIGN PATENT DOCUMENTS

EP      1221810 A2     7/2002

(Continued)

OTHER PUBLICATIONS

GB Search Report dated Jan. 5, 2007 for GB0621639.4.

*Primary Examiner* — Steven Kau

(57) ABSTRACT

Multiple images are combined where the images exhibit variations in illumination between one another. The images are of the same portion of an object, and each image is represented by a set of image data. A comparative data transform is applied to each set of image data, such that the transformed comparative image data isolates and preserves first variations in the illumination between the images but suppresses second differences in illumination between the images. At least one normalization transform is determined from the transformed comparative image data sets. When applied to at least one of the image data sets, the at least one normalization transform minimizes the variation in illumination between the image data sets. Each determined normalization transform is applied to the at least one of the image data sets. The normalized sets of image data are transformed to a single image of the portion of the object.

21 Claims, 3 Drawing Sheets

U.S. PATENT DOCUMENTS

| | | |
|---|---|---|
| 6,718,067 B1 | 4/2004 | Wang |
| 7,002,624 B1 | 2/2006 | Uchino et al. |
| 7,787,006 B2 * | 8/2010 | Sakai et al. .................. 347/253 |
| 2003/0133020 A1 | 7/2003 | Suh |
| 2004/0136603 A1 | 7/2004 | Vitsnudel et al. |
| 2004/0184667 A1 | 9/2004 | Raskar et al. |
| 2007/0097386 A1 | 5/2007 | Tregoning et al. |
| 2007/0165960 A1 * | 7/2007 | Yamada ........................ 382/254 |

FOREIGN PATENT DOCUMENTS

| | | |
|---|---|---|
| EP | 1233606 A2 | 8/2002 |
| WO | WO 0010114 A1 | 2/2000 |

* cited by examiner

MULTIPLE IMAGE COMBINATION VIA COMPARATIVE DATA TRANSFORM AND NORMALIZATION TRANSFORM APPLICATION

CROSS-REFERENCE TO RELATED APPLICATION

This application claims the benefit of UK Patent Application No. GB 0621639.4, filed 31 Oct. 2006, the entirety of which is hereby incorporated by reference herein.

BACKGROUND TO THE INVENTION

There are many applications that need optical scanners to convert objects, such as text and graphics objects on paper-based materials, for example, to an electronic format that can be subsequently analysed, distributed and archived. One of the more popular type of consumer optical scanners is flatbed scanner type device that converts objects, including pictures and papers, to image data that can be used, for example, for building Web pages and optical character recognition. The optical scanners may be referred to as image scanners as the output thereof is generally in digital images.

Similar to a copy machine, a flatbed scanner generally includes a cover or lid and a glass panel. Generally a scanning document must be placed on the glass panel face down with the lid closed, so that an image sensing mechanism or imager in a compartment located beneath the glass panel can properly scan the scanning document. The image sensing mechanism generally includes one or more light sources, such as LEDs arranged below the glass panel that illuminate the scanning document. The light that is reflected from the scanning document is received by an image sensor, such as a charge coupled device (CCD), a contact image sensor (CIS) or a CMOS sensor.

Whilst such known flatbed scanners are suitable for many applications, the colour accuracy of data generated by such scanners can be improved. One way to improve colour accuracy is to increase the number of colour channels that are captured by a scanner. Generally speaking, a captured image contains signal data across a colour spectrum. An individual colour channel may hold some signal related to most or all parts of the colour spectrum, but each channel will hold signal that has a different weight at different parts of the spectrum. One channel may be biased towards greenish colours whereas another may be biased towards reds or blues, etc. To represent a colour we treat each channel as a dimension. Similar shades of red, for example, would be represented as a volume defined by three number ranges, one range in each of the three channels. A set of colour channels that represents a particular gamut of colours is generally referred to as a colour space. Generally two or three colour channels are used to represent a colour space, although other colour spaces having other numbers of colour channels are known. One way of increasing the number of captured colour channels to improve the colour accuracy of flatbed scanners has been disclosed in our co-pending U.S. patent application Ser. No. 11/263,482 entitled "Image Optimisation System and Method" filed the 31 Oct. 2005, the disclosure of which is incorporated herein by reference. U.S. patent application Ser. No. 11/263,482 uses two separate light sources, or groups of light sources, with different spectral properties. Thus a first set of colour channels is recorded by the image sensor when the first light source is used and a further second set of colour channels is recorded by the image sensor when the second light source having the different spectral properties is used. The two scans can be used to provide the additional spectral information required to give improved colour accuracy.

However, whenever multiple images having different captured colour channels are combined there is a risk that the illumination levels between the images are unequal, either through the use of different light sources (as in the above-mentioned US patent application) or changing illumination levels between each image being captured. The inconsistencies between the captured images may give rise to undesirable anomalies in the combined image. The present invention seeks to ameliorate these anomalies.

SUMMARY OF THE INVENTION

According to a first aspect of the present invention there is provided a method of combining multiple images wherein the images exhibit variations in illumination between one another, the method comprising: generating a plurality of images of the same portion of an object, each image being represented by a respective set of image data; applying a comparative data transform to each set of image data such that the transformed comparative image data isolates and preserves variations in the illumination between the plurality of images; determining at least one normalization transform from the transformed comparative image data sets such that when applied to at least one of the plurality of image data sets minimizes the variation in illumination between the plurality of image data sets; applying the or each determined normalization transform to the or each respective set of image data; and transforming the normalized sets of image data to a single image of the portion of the object.

In the context of the current application a comparative data transform is an image transform that suppresses desirable or tolerable differences in illumination between multiple images while preserving differences that give undesirable inconsistencies when images are combined. In the case of images captured with differing light sources the colour differences due to spectral properties of the light sources are suppressed by the comparative transform but the shading differences due to illumination direction inconsistencies are preserved. In the absence of illumination direction differences, the comparative image data from the multiple images should be very similar, or preferably identical. In the presence of illumination direction differences, the differences between the comparative image data should indicate the positions and magnitude of the illumination inconsistencies.

Preferably at least one of the comparative and normalisation transforms may comprise a null transform.

The normalization transforms may be determined by determining the ratio of the pixel values of the comparative image data for a first of the plurality of images to the comparative image data for a second image of the plurality of images. Alternatively, they may be determined by comparing the image data value for each corresponding pixel location for first and second comparative image data and determining a scaling factor for each pixel location to equalize the respective image data value.

For example, in the case of a scanner that generates first and second images having desirable spectral differences wherein the first and second comparative transforms each generate a comparative image having only one channel, the normalization transforms for the first and second images are preferably determined by comparing the pixel values for each corresponding pixel location for the first and second comparative image data and determining a scaling factor for each pixel location that if applied to the corresponding pixels of the first and second images and then applying the first and second comparative transforms to the scaled first and second images would generate first and second comparative images that are substantially the same or identical.

The step of applying the normalization transform may be omitted if the scaling factor for a pixel location falls outside a predetermined range of values. Additionally, the step of applying the normalization transform is omitted only in respect of the pixel location for which the scaling factor falls outside the predetermined range of values.

At least one of the plurality of images may be composed within a different colour space to the remaining images. Additionally or alternatively, each comparative image may be composed within a colour space that is different to the colour space of any one of the plurality of images. Additionally, at least one of the comparative images may be composed in a different colour space to each of the remaining comparative images. Furthermore, the colour space of each comparative image may have one or more colour channels, with the number of colour channels of a first comparative image being optionally different to the number of channels in a second comparative image.

Generating the first and second image data preferably comprises illuminating the portion of the object with a respective first and second light source arranged to provide respectively different illumination spectra.

According to a second aspect of the present invention there is provided an image processing system comprising: an image sensor arranged to capture a plurality of images of the same portion of an object, each image being represented by a respective set of image data; and a data processor arranged to: transform at least a portion of each image data set to a respective comparative image such that the transformed comparative images isolates and preserves variations in the illumination between the plurality of images; determine at least one of normalization transform from the transformed comparative image data that when applied to at least one of the plurality of image data sets minimizes the variation in illumination between the plurality of image data sets; apply the or each determined normalization transform to at least one set of image data; and transform the normalized sets of image data to a single image of the portion of the object.

Preferably at least one of the comparative and normalization transforms may comprise a null transform.

The normalization transform transforms may be determined by determining the ratio of the pixel values of the comparative image data for a first of the plurality of images to the comparative image data for a second image of the plurality of images. Alternatively, they may be determined by comparing the image data value for each corresponding pixel location for a first and second comparative image data and determining a scaling factor for each pixel location to equalize the respective image data value.

Additionally or alternatively, the data processor may be arranged to omit the step of applying the normalization transform if the scaling factor for a pixel location falls outside a predetermined range of values. Preferably, the data processor is arranged to omit applying the normalization transform only in respect of the pixel location for which the scaling factor falls outside the predetermined range of values.

According to a third aspect of the present invention there is provided a flatbed scanner comprising: an image sensor arranged to capture a plurality of images of the same portion of an object, each image being represented by a respective set of image data; and a data processor arranged to: transform at least a portion of each image data set to a respective comparative image such that the transformed comparative images isolates and preserves variations in the illumination between the plurality of images; determine at least one normalization transform from the transformed comparative image data that when applied to at least one of the plurality of image data sets minimizes the variation in illumination between the plurality of image data sets; apply the or each determined normalization transform to at least one set of image data; and transform the normalized sets of image data to a single image of the portion of the object.

According to a forth aspect of the present invention there is provided a method of combining multiple images wherein the images exhibit variations in illumination between one another, the method comprising: generating a plurality of images of the same portion of an object, each image being represented by a respective set of image data and each image being composed within a different color space; applying a comparative data transform to each set of image data, each transformed comparative image data set comprising a single data channel having pixel values indicative of the illumination level such that the transformed comparative image data isolates and preserves variations in the illumination between the plurality of images; determining at least one normalization transform from the transformed comparative image data sets such that when applied to at least one of the plurality of image data sets minimizes the variation in illumination between the plurality of image data sets; applying the or each determined normalization transform to the or each set of image data; and transforming the normalized sets of image data to a single image of the portion of the object.

According to a fifth aspect of the present invention there is provided an image processing system comprising: an image sensor arranged to capture a plurality of images of the same portion of an object, each image being represented by a respective set of image data and being composed within a different color space, wherein the images exhibit variations in illumination between one another; and a data processor arranged to: transform each image data set to a respective comparative image each transformed comparative image being composed within a single data channel having pixel values indicative of the illumination level such that the transformed comparative images isolate and preserve variations in the illumination between the plurality of images; determine at least one of normalization transform from the transformed comparative image that when applied to at least one of the plurality of image data sets minimizes the variation in illumination between the plurality of images; apply the or each determined normalization transform to the or each image data; and transform the normalized sets of image data to a single image of the portion of the object.

DESCRIPTION OF EMBODIMENTS OF THE INVENTION

Figure 1:
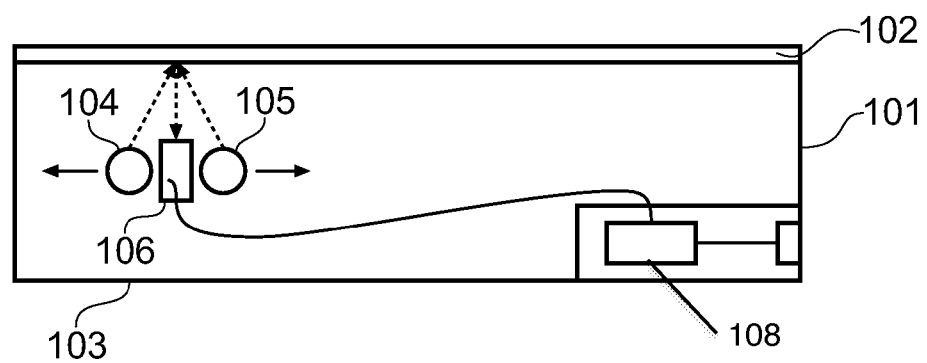
FIG. 1 schematically illustrates a flatbed scanner according to an embodiment of the present invention.

FIG. 1 is a schematic representation of a flatbed scanner 101 according to an embodiment of the present invention. The scanner includes a glass panel 102 onto which a document to be scanned can be placed face down. The glass panel 102 encloses a housing 103 that contains image sensing apparatus. Although not illustrated in FIG. 1, the scanner 101 can also include a cover or lid hinged along one edge of the glass panel 102 that can be closed on top of a document placed on a glass panel. The imaging apparatus includes the first and second light sources 104, 105, an image sensor 106, and a data processor 108. In the embodiment illustrated in FIG. 1, the first and second light sources 104, 105 are arranged either side of the image sensor 106. The first and second light sources and image sensor preferably extend across the complete width of the glass panel 102. The first and second light sources and image sensor are mounted on a transport mechanism (not shown) that is arranged to convey the light sources and image sensor in the horizontal directions indicated by the solid arrows such that in use the light sources and image sensor are passed across the entirety of the document to be scanned in a conventional manner. The broken arrows illustrated in FIG. 1 indicate the general path of the light rays from each light source 104, 105 to the document placed on top of the glass panel 102 and the reflected light rays back to the image sensor 106. It will be appreciated by those skilled in the art that other arrangements of light sources and image sensor may be employed, for example the image sensor 106 may be located remotely from the light sources within the housing 103 of the scanner and the reflected light directed to the sensor by one or more mirrors or lenses. All such arrangements utilizing two separate light sources fall within the scope of embodiments of the present invention.

The first and second light sources 104, 105 have a different spectral output to one another. That is when the intensity of the light output is measured for each wavelength produced by the respective light sources, a different distribution results for each light source. Suitable light sources may include cold cathode fluorescent light sources (CCFLs), although other known light sources or mixtures of light sources may also be used. According to embodiments of the present invention, at least a portion of the document to be scanned is firstly illuminated with the first light source 104 and then the other 105. Image data representing an image of the scanned portion is then generated using the light reflected from or transmitted through the scanned document (depending on the desired nature of the scanner). This data is generating using the image sensor 106, which may include CCD, CMOS or CIS sensors. The image sensor 106 preferably has red, green and blue sensing elements to generate three colour channels from each scan. The total image data thus comprises at least six colour channels of information (e.g. channels C1, C2 and C3 corresponding to red, green and blue channels resulting from illumination with the first light source 104 and C4, C5, and C6 corresponding to red, green, and blue channels resulting from illumination with the second light source 105—). Compared with the normal three channels of image data present from a conventional scan using a single light source as is known from the prior art, the six channels comprise additional colour information that can be used to improve the accuracy of resultant scanned data. One way to do this has been disclosed in U.S. patent application Ser. No. 11/263,482, referred to above, and includes applying an N×3 matrix (where N is the number of colour channels in the scanner, in this case six) to the N×1 matrix representing the colour channels of the colour space of the scanning device. For example, for a six colour channel device from which it is required to produce a three channel RGB output, this would be achieved by the following matrix multiplication:—

$$\begin{bmatrix} R \\ G \\ B \end{bmatrix} = \begin{bmatrix} M_{11} & M_{12} & \cdot & M_{16} \\ M_{21} & M_{22} & \cdot & M_{26} \\ M_{31} & M_{32} & \cdot & M_{36} \end{bmatrix} \begin{bmatrix} C_1 \\ C_2 \\ \cdot \\ C_6 \end{bmatrix}$$

The values of the 6×3 matrix integers $M_{11}$ etc. can be any real number, including zero.

Figure 2A:
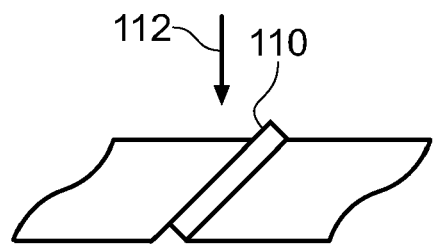
FIG. 2a illustrates a 3D object illuminated by a single light source and a representation of a scanned image of the object.
Figure 2A:
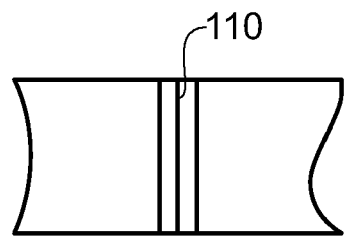
Figure 2B:
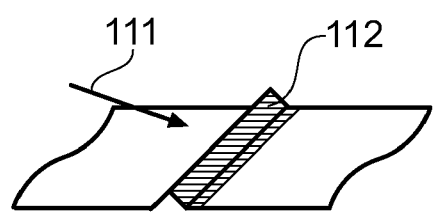
FIG. 2b illustrates the 3D object of FIG. 2a illuminated by a first one of two light sources and a representation of a scanned image of the object.
Figure 2B:
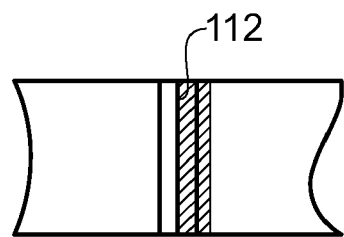
Figure 2C:
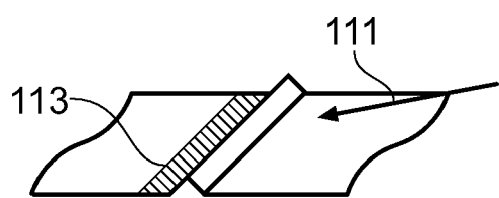
FIG. 2c illustrates the 3D object of FIG. 2a illuminated by a second one of two light sources and a representation of a scanned image of the object.
Figure 2C:
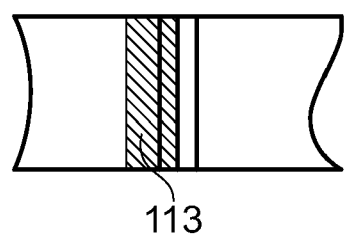
Figure 2D:
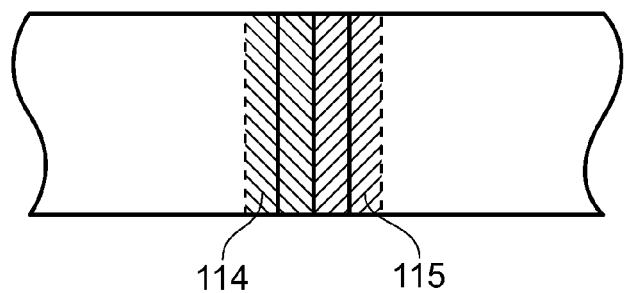
FIG. 2d illustrates a representation of a combined image formed from the scanned images illustrated in FIGS. 2b & 2c when not utilizing embodiments of the present invention.

While the above technique works well if the scanning document is perfectly flat and has no surface imperfections, if the scanning document includes any creases or indentations, or in fact the object to be scanned is three dimensional, the above technique exhibits a significant disadvantage. FIG. 2a illustrates a perspective view of a portion of a scanning document that includes an upturned crease 110. In FIG. 2a it is assumed that a single light source is provided substantially directly above the crease 110, as indicated by a solid arrow 111. Note that in FIGS. 2a-2c the light source is represented as being above the scanning document, rather than below as indicated in FIG. 1, purely for ease of illustration and understanding. A corresponding scanned image of the document portion and crease is schematically illustrated adjacent to the perspective view. In FIG. 2a the light source 111 is illustrated as being directly above the crease 110. The scanned image thus produced, and illustrated on the right hand side of FIG. 2a, whilst clearly showing the crease 110, has uniform color reproduction and thus looks much as it would appear to the human eye. In FIG. 2b the light source 111 is illustrated as being offset to one side of the crease 110, as will be the case in embodiments of the present invention where two separate light sources are utilized, the offset light source illustrated in FIG. 2b being representative of the first of the two light sources located to one side of the image sensor. Due to the offset nature of the light source into FIG. 2b and area of shadow 112 is generated on the resulting scanned image, as illustrated by the hatched region. On the other hand, and as illustrated into FIG. 2c, should the light source 111 be directed from the opposite side of the crease from that illustrated into FIG. 2b, as would be the case if the illumination was from the second light source in embodiments of the present invention, a second shadow area 113 is generated on the scanned image on the opposite side of the crease to that illustrated in FIG. 2b. In other words, the scanned image represented in FIG. 2b is that that would be obtained from the first light source in embodiments of the present invention utilizing a first set of color channels, whilst the scanned image illustrated in FIG. 2c is that that would be obtained from using the second light source utilizing a second set of color channels. If the image data from the two separate scans were to be combined to the target color space utilizing the method disclosed in U.S. Ser. No. 11/263,482 as discussed above, the inconsistent areas of the two shadow regions would give rise to color anomalies, since in those shadow areas the first three channels and the second three channels of data used in the 6×3 matrix multiplication to calculate the object's color would have mutually inconsistent signal levels, as schematically illustrated in FIG. 2d. Depending on the elements (M11 to M36) of the particular 6×3 matrix, the color anomalies indicated as 114 and 115 in FIG. 2*d* would typically appear as non-realistic colors, such as lurid purple for 114 and lurid green for 115 for example.

The present invention seeks to overcome any color anomalies resulting from inconsistent illumination of the first and second images by normalizing the first and second images and then combining the normalized images to generate a single image with improved color accuracy. This is done by transforming the image data for each scan to an intermediate comparative form that suppresses the desirable spectral inconsistencies in the original scans while preserving the shading inconsistencies. Thus a first comparative transform is required to transform the first image from a first color space to generate the first comparative image data and a second comparative transform is required to transform the second image from a second color space to generate the second comparative image data. Pixel-by-pixel matrix multiplications may suitably be used for these transforms. Preferably the transforms use 3×1 matrices, as below, that generate comparative image data (CI1 and CI2) each having a single data channel.

$$[CI1] = [T1 \ T2 \ T3] \begin{bmatrix} C1 \\ C2 \\ C3 \end{bmatrix}$$

for the first image, and $$[CI2] = [T4 \ T5 \ T6] \begin{bmatrix} C4 \\ C5 \\ C6 \end{bmatrix}$$

for the second image.

The matrix elements T1 to T3 for the first comparative transform and elements T4 to T6 for the second comparative transform should preferably be chosen to each generate a single data channel with pixel values that are indicative of the illumination levels of the corresponding pixels of the first and second images respectively and that do not exhibit significant inconsistencies due to the different spectral properties of the first and second images. Such comparative image data facilitates derivation of suitable normalization transforms as will now be described. A pixel-by-pixel scale factor, or gain, may suitably be used as a normalization transform to remove inconsistencies from the first and second images that are due to illumination differences. Such a scale factor for a pixel of the second image can be calculated from the comparative image data as below.

$$NT2 = CI1/CI2,$$

where NT2 is the normalization scale factor for a pixel of the second image and CI1 and CI2 are the corresponding pixel values of the first and second comparative images calculated from the first and second images as previously described. In this case the scale factor for the first image may suitably be one at all pixel positions. In other words the first normalization transform can be a null transform that leaves pixel values of the first image unchanged. Once determined, these scaling factors are then applied to each of the original image scans in the first and second color spaces to produce normalized image data within these original color spaces. The two normalized sets of image data are then concatenated such that they represent the scanned portion of the object in a new single six-channel color space, and the color improvement method from U.S. application Ser. No. 11/263,482 is applied as previously discussed, i.e. by applying a further transformation matrix, which in this case will be a 6×3 color correction matrix, to the six channel image data to transform that data to the final target three-channel color space.

The determination of the scaling factors and the normalization process can be accomplished in a number of ways, all within the scope of the present invention. For example, a single set of scaling factors may be determined and applied to the second image to remove illumination inconsistencies by replicating the illumination pattern of the first image, as described above. Alternatively, a different single set of scaling factors may be determined and applied to the first image to remove illumination inconsistencies by replicating the illumination pattern of the second image. As a further alternative, first and second sets of scaling factors may be determined and applied to the first and second images respectively in order to remove illumination inconsistencies by transforming both images to be consistent with some other real or imaginary illumination pattern. For example the first and second images could be normalized such that each of them appears to have been illuminated simultaneously by both light sources. This could be achieved by applying first and second normalization scaling factors determined as below.

$$NT1 = (CI1 + CI2)/2 \times CI1, \ NT2 = (CI1 + CI2)/2 \times CI2$$

Other normalization transforms are possible.

Figure 3:
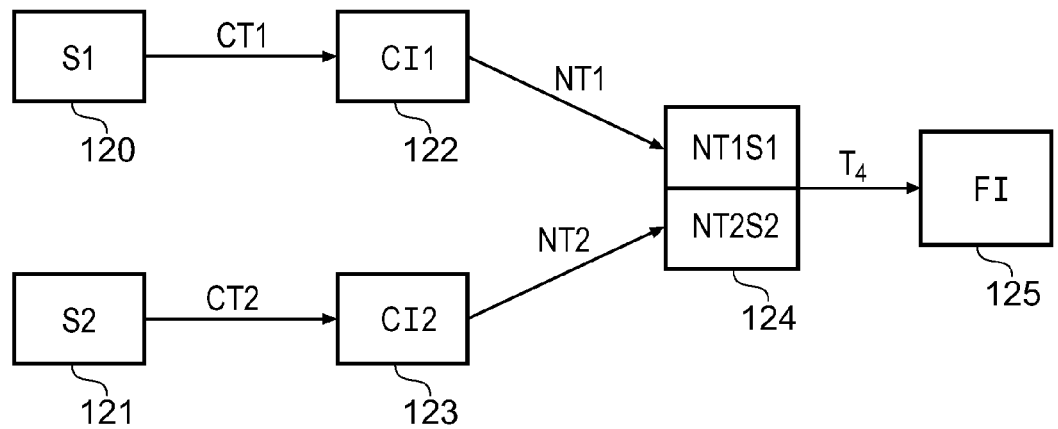
FIG. 3 schematically illustrates the method of generating an image according to an embodiment of the present invention.

FIG. 3 schematically illustrates the method of an embodiment of the present invention. First and second image scans S1 & S2 are generated as previously discussed and each original image scan is subsequently transformed to a comparative image CI1 & CI2 by means of respective transformation matrices CT1 and CT2. From the image values of the first and second scans S1 & S2 first and second normalization transforms NT1 & NT2 are determined and these are applied on a pixel-by-pixel basis to the original scanned images to generate a scaled, multi-channel scanned image data set 124. A final transformation matrix T4 is applied to the multi color space dataset to generate a final image data 125 having improved color accuracy without any false color abnormalities being introduced due to variations in illumination caused by the differences in relative positions of the first and second light sources in the scanning apparatus.

In the absence of undesirable inconsistencies, the results of the first and second comparative transforms should be very similar or identical. This gives us a mechanism by which to determine suitable comparative transforms for a given situation. For example, suitable comparative transforms for the scanner having two light sources of different spectra can be determined by a calibration process as follows. A flat colour test card is used as the scanning document and first and second scanned images of the colour test card are generated by the scanning apparatus using the first and second light sources as previously described. A colour test card generally includes a number of coloured regions on the card, each region having uniform colour characteristics. Such colour test cards may be obtained from known commercial sources or may be generated "in-house". Since the colour test card is flat and should therefore be immune to slight differences in illumination angle, suitable first and second comparative transforms should both map the three channels of the respective first and second test card scans to the same common single channel comparative image. There are many suitable common comparative images, but one such common image can be derived by measuring the density of each coloured region of the test card using a photo detector with a broad spectral response across the visible range of wavelengths while illuminating it with a broad white light source. It is then convenient to use known optimisation techniques to find a 3×1 matrix transformation that will map the mean values of C1, C2 and C3 of each coloured region of the first scan to a single value very close to the measured density value of the same region so as to minimise the sum squared difference of the mapped values from the corresponding density measurements across all regions. Similarly the known optimization techniques can be used find a 3×1 matrix transformation that will map the mean values of C4, C5 and C6 of each coloured region of the second scan to a single value very close to the measured density value of the same region so as to minimise the sum squared difference of the mapped values from the corresponding density measurements across all regions. It can be useful to introduce additional constraints to this optimisation process. For example the elements of the 3×1 matrices can be constrained such that T1+T2+T3=1, and/or T4+T5+T6=1. Alternatively each of T1 to T6 can be constrained to take a value in a predetermined range, for example 0.25<=Tn<=0.41, for n=1 to 6. Constraints such as these can improve the accuracy of the normalization process for dark regions of scans, noisy scans, and scans with highly saturated colours. Other methods for determining suitable comparative transforms exist.

As will be appreciated, since the scanning apparatus of embodiments of the present invention includes two separate light sources but only a single image sensor, two separate image scans must be performed for each scanning operation on a single document or object. Consequently, this allows the possibility that the scanning document or object may have moved between the first and second scans, or the scanning mechanism itself may have moved relative to the document or object, for example due to simple mechanical tolerances in the scanning mechanism. Therefore, there may be some misalignment between the first and second image scans recorded by the image sensor. Such misalignment will introduce apparent differences in illumination between the first and second scans, even if no such differences actually existed. In embodiments of the present invention this can be determined and mitigated against during the correction process.

The comparative transforms derived by the calibration method described herein will suppress spectral inconsistencies between the two scans but will not suppress illumination inconsistencies, nor will they suppress inconsistencies between corresponding pixels due to misalignment of the first and second scans. An alternative normalization process could be devised to remove alignment inconsistencies from the normalized first and second images as well as or instead of removing illumination inconsistencies. Even the normalization process described herein to scale the first and second images to remove illumination inconsistencies will significantly reduce inconsistencies due to misalignment. Misalignment of the first and second scans will result in relatively large variations between corresponding pixel values in some regions of the first and second comparative images. These large variations will result in relatively aggressive scaling factors, the presence of which can thus be used as an indication of misalignment between the two original image scans. It is therefore possible in embodiments of the present invention to monitor the scaling factors and where they fall outside a given range of values alternative processing actions can be taken to avoid the suggested misalignment of the image scans causing undesired false color artifacts. For example, if the scaling factor is greater than 2 or less than 0.5 only the data from a single one of the first or second image scans is used to generate the final image data. Preferably, the determination to only use a single set of three channel image data is done on a pixel-by-pixel basis. An alternative embodiment includes combining the six channel image data generated by the scaling process with the three channel color data from one of the original image scans, by for example a simple averaging process, where the scaling factor indicates misalignment has occurred. Again, this preferably is performed on a pixel-by-pixel basis. As a further alternative to this latter embodiment, the mixing ratio of the three channel and six channel image data may be varied according to the value of the scaling data, so that scaling data having a high value, and thus indicative of a gross misalignment, is used to cause the mixing of the three channel and six channel data to be biased heavily towards the three channel data.

It will be appreciated that the choice of scaling strategy can be made so as to achieve a particular result with regards to the final image data. For example, the scaling strategy adopted may be such as to minimise or maximise any reflections or shadows present in the original scanned image data. It will also be appreciated that by appropriate selection and/or manipulation of the scaling strategy and scaling factors, it is possible to generate final image data that is substantially equivalent to image data that would have been produced using alternatively positioned illumination sources.

In some further embodiments the amount of data processing required to perform a method of embodiments of the present invention may be reduced by recording the scanned image data for one of the original image scans at a lower resolution to that recorded for the other original image scan. As will be known to those skilled in the art, this can be accomplished by varying one or both of the image sensor readout rate and the rate at which the scanning mechanism moves across the scanned document, thus decreasing the overall number of samples per unitary of the scanned document and thus reducing the amount of data. Such lower resolution scans still contain a good color and illumination information, but are lacking in feature detail. By passing the data from the high resolution scan through a low pass filter, such as Gaussian spatial filter for example, the low frequency components equivalent to the color and illumination data present in the lower resolution scan can be extracted and this reduced data set can be processed according to the methods of the present invention described above, i.e. first and second low resolution image data transformed to a form from which appropriate scaling factors can be determined, appropriate scaling factors applied to normalise two sets of data and the normalized data combined to generate a single six channel image data set. At this point the final color correction can be performed to transform the 6 channels to a desired final three-channel color space. The original or suitably transformed high frequency component data from the high resolution scan can then be added back to produce a final high resolution image. Even if both scans are high resolution scans, it may be advantageous to extract high frequency components, apply the normalization method of the present invention to the low frequencies of each scan and then add back the original or suitably modified high frequency components of one or other or both scans either before or after transforming the six channels down to three channels in some target color space.

Whilst the above embodiments of the present invention have been described in the context a dual lamp scanner, it will be appreciated that the present invention is equally applicable to any other context where it is desired to combine two or more images that have inconsistencies in their signal levels due to changes or inconsistencies in the capture process. For example, the present invention is equally applicable in the context of digital photography where images may be captured under inconsistent lighting conditions.

The invention claimed is:

1. A method of combining multiple images wherein the images exhibit variations in illumination between one another, the method comprising:
    generating a plurality of images of the same portion of an object, by a hardware image sensor, each image being represented by a respective set of image data;
    applying, by a hardware processor, a comparative data transform to each set of image data such that the transformed comparative image data isolates and preserves first variations in the illumination between the plurality of images but suppresses second variations in the illumination between the plurality of images;
    determining, by the hardware processor, at least one normalization transform from the transformed comparative image data sets such that when applied to at least one of the plurality of image data sets the variation in illumination between the plurality of image data sets is minimized;
    applying, by the hardware processor, the at least one determined normalization transform to the at least one of the plurality of image data sets; and
    transforming, by the hardware processor, the normalized sets of image data to a single image of the portion of the object.

2. The method of claim 1, wherein at least one of the comparative transform and the at least one normalization transform comprises a null transform.

3. The method of claim 1, wherein determining the at least one normalization transform comprises determining the ratio of the pixel values of the comparative image data for a first of the plurality of images to the comparative image data for a second image of the plurality of images.

4. The method of claim 1, wherein determining the at least one normalization transform comprises comparing the image data value for each corresponding pixel location for a first and a second set of comparative image data and determining a scaling factor for each pixel location to equalize the respective image data value.

5. The method of claim 4, wherein the step of applying the normalization transform is omitted if the scaling factor for a pixel location falls outside a predetermined range of values.

6. The method of claim 5, wherein the step of applying the normalization transform is omitted only in respect of the pixel location for which the scaling factor falls outside the predetermined range of values.

7. The method of claim 1, wherein at least one of the plurality of images is composed within a different color space to the remaining images.

8. The method of claim 1, wherein each comparative image is composed within a color space that is different to the color space of any one of the plurality of images.

9. The method of claim 8, wherein at least one of the comparative images is composed in a different color space to each of the remaining comparative images.

10. The method of claim 1, wherein the color space of each comparative image has one or more color channels.

11. The method of claim 10, wherein the number of color channels of a first comparative image is different to the number of channels in a second comparative image.

12. The method of claim 1, wherein generating the plurality of images comprises one of:
    illuminating the portion of the object with at least two different light sources arranged to provide respectively different illumination spectra;
    capturing the images with at least two different image sensors; and applying at least two different filters to an image sensor.

13. An image processing system comprising:
    an image sensor arranged to capture a plurality of images of the same portion of an object, each image being represented by a respective set of image data; and
    a data processor arranged to:
        transform at least a portion of each image data set to a respective comparative image such that the transformed comparative images isolates and preserves first variations in the illumination between the plurality of images but suppresses second variations in the illumination between the plurality of images;
        determine at least one of normalization transform from the transformed comparative image data that when applied to at least one of the plurality of image data sets the variation in illumination between the plurality of image data sets is minimized;
        apply the at least one determined normalization transform to the at least one of the plurality of image data sets; and
        transform the normalized sets of image data to a single image of the portion of the object.

14. An imaging system according to claim 13, wherein at least one of the comparative transform and the at least one normalization comprises a null transform.

15. The imaging system of claim 13, wherein the at least one normalization transform is determined at least by determining the ratio of the pixel values of the comparative image data for a first of the plurality of images to the comparative image data for a second image of the plurality of images.

16. The imaging system claim 13, wherein the at least one normalization transform is determined at least by comparing the image data value for each corresponding pixel location for the first and second intermediate image data and determining a scaling factor for each pixel location to equalize the respective image data value.

17. The imaging system of claim 16, wherein the data processor is arranged to omit the step of applying the normalization transform where the scaling factor for a pixel location falls outside a predetermined range of values.

18. The imaging system of claim 17, wherein the data processor is arranged to omit applying the normalization transform only in respect of the pixel location for which the scaling factor falls outside the predetermined range of values.

19. A flatbed scanner comprising:
    an image sensor arranged to capture a plurality of images of the same portion of an object, each image being represented by a respective set of image data; and
    a data processor arranged to:
        transform at least a portion of each image data set to a respective comparative image such that the transformed comparative images isolates and preserves first variations in the illumination between the plurality of images but suppresses second variations in the illumination between the plurality of images;
        determine at least one normalization transform from the transformed comparative image data such that when applied to at least one of the plurality of image data sets the variation in illumination between the plurality of image data sets is minimized;
        apply the at least one determined normalization transform to the at least one of the plurality of image data sets; and
        transform the normalized sets of image data to a single image of the portion of the object.

20. A method of combining multiple images wherein the images exhibit variations in illumination between one another, the method comprising:
- generating a plurality of images of the same portion of an object, by a hardware image sensor, each image being represented by a respective set of image data and each image being composed within a different color space;
- applying, by a hardware processor, a comparative data transform to each set of image data, each transformed comparative image data set comprising a single data channel having pixel values indicative of the illumination level such that the transformed comparative image data isolates and preserves first variations in the illumination between the plurality of images but suppresses second variations in the illumination between the plurality of images;
- determining, by the hardware processor, at least one normalization transform from the transformed comparative image data sets such that when applied to at least one of the plurality of image data sets the variation in illumination between the plurality of image data sets is minimized;
- applying the at least one determined normalization transform to the at least one of the plurality of image data sets; and
- transforming the normalized sets of image data to a single image of the portion of the object.

21. An image processing system comprising:
- an image sensor arranged to capture a plurality of images of the same portion of an object, each image being represented by a respective set of image data and being composed within a different color space, wherein the images exhibit variations in illumination between one another; and
- a data processor arranged to:
  - transform each image data set to a respective comparative image each transformed comparative image being composed within a single data channel having pixel values indicative of the illumination level such that the transformed comparative images isolate and preserve first variations in the illumination between the plurality of images but suppress second variations in the illumination between the plurality of images;
  - determine at least one of normalization transform from the transformed comparative image such that when applied to at least one of the plurality of image data sets the variation in illumination between the plurality of images is minimized;
  - apply the at least one determined normalization transform to the at least one of the plurality of image data sets; and
  - transform the normalized sets of image data to a single image of the portion of the object.

* * * * *

UNITED STATES PATENT AND TRADEMARK OFFICE
CERTIFICATE OF CORRECTION

| | |
|---|---|
| PATENT NO. | : 8,218,202 B2 |
| APPLICATION NO. | : 11/930981 |
| DATED | : July 10, 2012 |
| INVENTOR(S) | : Andrew Hunter et al. |

Page 1 of 1

It is certified that error appears in the above-identified patent and that said Letters Patent is hereby corrected as shown below:

In the Specifications:

In column 4, line 51, below "of the object." insert -- For a better understanding of the present invention embodiments of the present invention will now be described, by way of illustrative example only, with reference to the following drawings of which:- --.

In the Claims:

In column 12, line 27, in Claim 14, delete "normalization" and insert -- normalization transform --, therefor.

In column 12, line 33, in Claim 16, delete "system" and insert -- system of --, therefor.

Signed and Sealed this
Twenty-second Day of January, 2013

David J. Kappos
*Director of the United States Patent and Trademark Office*